(12) United States Patent
Chung (10) Patent No.: US 12,446,780 B2
(45) Date of Patent: Oct. 21, 2025

(54) SPECTRAL DOMAIN-OPTICAL NONLINEARITY TOMOGRAPHY DEVICE

(71) Applicant: PHILOPHOS, INC., Daejeon (KR)

(72) Inventor: Jung Ho Chung, Yongin-si (KR)

(73) Assignee: PHILOPHOS, INC., Daejeon (KR)

( * ) Notice: Subject to any disclaimer, the term of this patent is extended or adjusted under 35 U.S.C. 154(b) by 0 days.

(21) Appl. No.: 18/675,347

(22) Filed: May 28, 2024

(65) Prior Publication Data

US 2024/0306918 A1    Sep. 19, 2024

Related U.S. Application Data

(63) Continuation of application No. PCT/KR2022/003944, filed on Mar. 22, 2022.

(30) Foreign Application Priority Data

Nov. 25, 2021   (KR) .................. 10-2021-0164575

(51) Int. Cl.
*A61B 5/00* (2006.01)
(52) U.S. Cl.
CPC ................... *A61B 5/0066* (2013.01)
(58) Field of Classification Search
CPC ................................................. A61B 5/0066
See application file for complete search history.

(56) References Cited

U.S. PATENT DOCUMENTS

2014/0085633 A1  3/2014  Preston
2017/0356734 A1  12/2017 Hendon

FOREIGN PATENT DOCUMENTS

| JP | 5192395 B2 | 5/2013 |
| JP | 2018-534557 A | 11/2018 |
| KR | 10-1226442 B1 | 1/2013 |
| KR | 10-1986637 B1 | 6/2019 |
| WO | 2012118079 A1 | 9/2012 |
| WO | 2016056522 A1 | 4/2016 |

*Primary Examiner* — Joseph M Santos Rodriguez
(74) *Attorney, Agent, or Firm* — Dinsmore & Shohl LLP; Yongsok Choi, Esq.

(57) ABSTRACT

An optical tomography device includes a sample optical path system for injecting light, scanned from a light source, into a sample corresponding to biological tissue; a reference optical path system for collecting the light scanned from the light source; and a detection unit for detecting a tomography image of the sample by interfering with sample light, transmitted from the sample optical path system and reflected from the sample, and reference light transmitted from the reference optical path system. The detection unit comprises: a nonlinear crystal which receives the sample light and the reference light and generates nonlinear light having a different wavelength than the sample light and the reference light; and an image sensor which detects a depth direction signal from the nonlinear light.

12 Claims, 7 Drawing Sheets

SPECTRAL DOMAIN-OPTICAL NONLINEARITY TOMOGRAPHY DEVICE

CROSS-REFERENCE TO RELATED APPLICATION

This is a continuation of International Application No. PCT/KR2022/003944 filed on Mar. 22, 2022, which claims priority to Korean Patent Application No. 10-2021-0164575 filed on Nov. 25, 2021, the entire contents of which are herein incorporated by reference.

TECHNICAL FIELD

The present invention relates to a spectral domain-optical nonlinearity tomography device, and more particularly, to a tomography device having a better image contrast ratio, image detection speed, and observation depth than a conventional optical coherence tomography (OCT) device.

BACKGROUND ART

Optical coherence tomography (OCT) is a technology that uses light to observe the inside of a biological tissue, and is an advanced medical diagnosis technology used in fields such as ophthalmology and cardiovascular disease. An OCT type may include time domain, spectral domain, and swept source types. Among these methods, a spectral domain type OCT system is spotlighted due to its secured performance of a certain level or higher and reasonable manufacturing cost.

Figure 1:
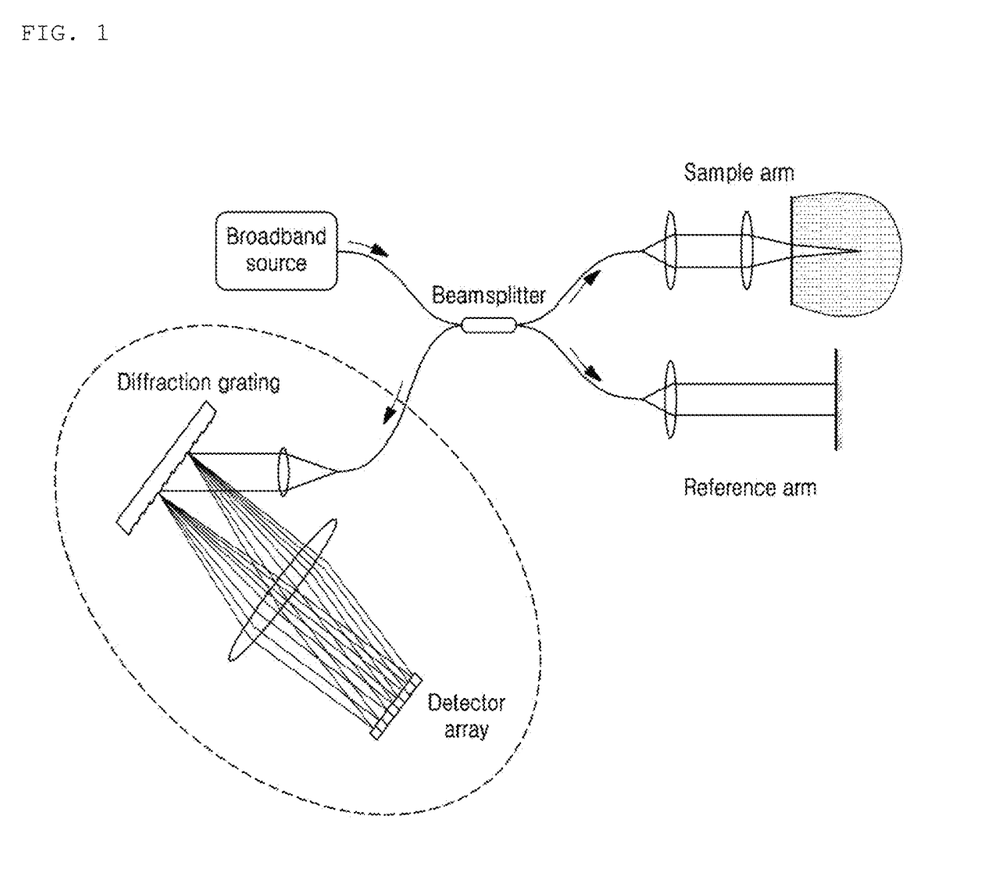
FIG. 1 is a structural diagram of an optical coherence tomography (OCT) device according to a conventional technology.

A structure of a conventional optical coherence tomography (OCT) device may be seen when referring to FIG. 1. FIG. 1 relates to a spectral domain (SD)-optical coherence tomography (OCT) device (hereinafter referred to as SD-OCT). In detail, the conventional SD-OCT may include a light source unit, a beam splitter, a sample optical path system, a reference optical path system, and a detection unit. Here, the light source unit may use a light source having a wide wavelength band and low interference (or low coherence). The light source generated by the light source unit may be scanned by being split into the sample optical path system and the reference optical path system by the beam splitter. Here, light incident on a sample (mainly, a biological tissue in the tomography) and then reflected or scattered may be returned to the sample optical path system, and light incident from the beam splitter may be reflected through a mirror and returned to the reference optical path system. Here, returned reference light and returned sample light may be coupled to each other by the detection unit to cause interference, and the SD-OCT may detect this interference signal and acquire a tomography image of the sample. To describe the SD-OCT in more detail, its detection unit may spread spectra of the returned reference light and sample light, and collect the same on a line-shaped detector array (or image sensor), generally referred to as a line scan camera and transform input light for each wavelength into an electrical signal.

In general, the detector functions to convert incident photons into a current. Here, an output current is proportional to energy of incident light, and the current measured by the detector of the OCT may be expressed mathematically as follows.

$$I_D = \frac{\rho}{2}\langle |E_R + E_S|^2 \rangle = \frac{\rho}{2}\langle (E_R + E_S)(E_R + E_S)^* \rangle \quad \text{[Equation 1]}$$

Here, p indicates a responsivity value of the output current to the input optical power, sign < > indicates integration during an exposure time, sign | | indicates an amplitude of a complex number, $E_r$ and $E_s$ respectively indicate a reference light electric field and a sample light electric field, and * indicates collet complex number. The above expression may be further calculated as follows:

$$I_D = \frac{\rho}{2}\langle |E_R|^2 + |E_S|^2 + E_R E_S^* + E_R^* E_S \rangle \quad \text{[Equation 2]}$$

Here, the first term ($|E_R|^2$) of the four terms indicates an intensity of the reference light, the second term ($|E_S|^2$) indicates intensity of the sample light, which is usually much weaker than the reference light, and is thus ignored, and the third term ($E_R E_S^*$) and the fourth term ($E_R E_S$), which are further calculated and expressed as $2 \text{ Re } \{E_R E_s^*\}$, indicate a real value of $2E_R E_s^*$, and become an interference term, which is a core of the OCT.

Figure 2:
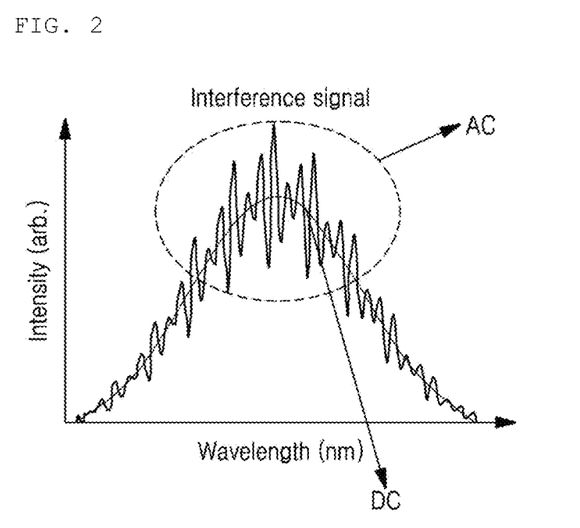
FIG. 2 is a graph showing an interference signal in a spectral domain that is detected by an image sensor of a spectral domain-optical coherence tomography (SD-OCT) device according to the conventional technology.

In general, a signal measured by the image sensor of the SD-OCT may be as shown in a graph of FIG. 2. Referring to the graph in FIG. 2, an X-axis corresponds to a serial number of each pixel acquired by the image sensor, which is roughly proportional to a wavelength component of input light, and a Y axis corresponds to an intensity value of a current value in Equation 2 that is transformed into a voltage value. Referring to the graph shown in FIG. 2, it may be seen that the image sensor detects noise-like components fluctuating along a specific trend line. Here, the fluctuating noise-like component may be referred to as an alternating current (AC) component, and the specific trend line along which this AC component follows may be referred to as a direct current (DC) component, by borrowing a component name from electrical signal analysis. Referring to Equation 2, the first term, that is, the intensity of the reference light, corresponds to the DC component, and the sum of the third and fourth terms, that is, the interference signal, corresponds to the AC component. The second term is much smaller than the first term, and may thus be ignored.

As shown in the graph of FIG. 2, the DC component occupies most of a dynamic range of the image sensor although the detection unit of the SD-OCT requires only the AC component corresponding to the interference signal. Therefore, a contrast ratio of a final tomography image may be lowered to an extent that the DC component occupies the range. Even though the SD-OCT is the most widely used equipment in ophthalmology, the SD-OCT inevitably provides an image having a limited contrast ratio. This limitation may also apply to a swept source-OCT (SS-OCT) method achieving the best performance. The SS-OCT may mainly use a balanced detector. Here, two detectors may only detect a case where phases of the AC components have a difference of 180 degrees in the same signal, and then extract only this difference. That is, a value of 2AC may be acquired when detecting a DC+AC component by using a first detector and a DC−AC component by using a second detector, and then finding a difference between these components. In this process, it may be convenient to remove the DC component. However, this method still fails to detect only the AC component corresponding to the interference signal and also measures the much larger DC component, thus lowering the contrast ratio.

Therefore, in optical tomography technology, if only the AC component is detected without the DC component, the contrast ratio of the image may be maximized, and this case may be considered as implementation of a very ideal technology.

Figure 3:
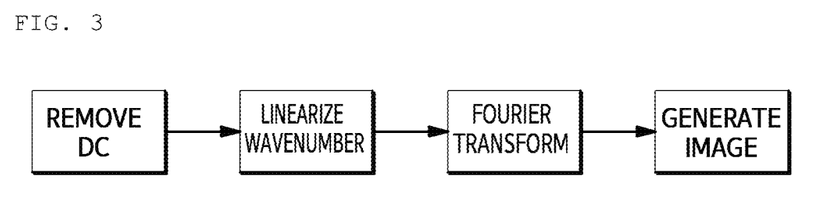
FIG. 3 is a block diagram of a signal processing process performed by a computer to derive a depth direction signal of FIG. 2.

In general, the signal measured as shown in FIG. 2 or Equation 2 for each wavelength may be transformed into a signal for depth through a process shown in FIG. 3. First, in a DC component removal step, a background signal (i.e., DC component) excluding the interference signal may be removed by pre-storing a signal detected when the sample light is blocked and subtracting the same each time. Second, the interference signal acquired in this way may be displayed along a wavelength axis, and may be resampled for this interference signal to be displayed based on its wavenumber. The reason is that physical concepts corresponding to each other by Fourier transform may correspond to time and frequency or length and wavenumber, and accordingly, the interference signal based on the wavenumber is required to be Fourier transformed in order to acquire a depth direction signal. Here, as a relationship where the wavenumber is a reciprocal of the wavelength, to strictly describe, relationship $k=2\pi/\lambda$ is used. Third, Fourier transform may be performed. Fourier transformation may derive asymmetric results for signals that are symmetrical about a center line, and derive symmetrical results for asymmetric input signals. Therefore, a result of performing Fourier transformation on the interference signals based on the wavenumber, which are the asymmetric signals, shows that the signals on the graph are symmetrical to each other based on $z=0$ when among values on a horizontal axis of FIG. 4, the value that corresponds to depth $z=0$ indicates that there is no path difference between the reference light and the sample light. Therefore, the signals on the left based on $z=0$, which corresponds to a mirror image, may be discarded. Only the signals in a region where $z>0$ may then be extracted, an absolute value of the extracted signal may be squared to generate only a magnitude component having its phase removed, and a larger magnitude component may then be compressed by performing a logarithmic operation thereon. In this way, an OCT value (or A-scan) based on a depth may be acquired from one point of the sample. While the sample light is moved along the horizontal axis of the sample by using a beam scanner (referred to as a beam steering), the A-scans may be repeatedly collected to thus complete one frame (referred to as a B-scan) of a cross-sectional image of the OCT. Hereinabove, the description describes a representative signal processing process of the SD-OCT, and this process may include an additional process performed for the best image quality, such as Hanning window or dispersion removal.

Figure 4:
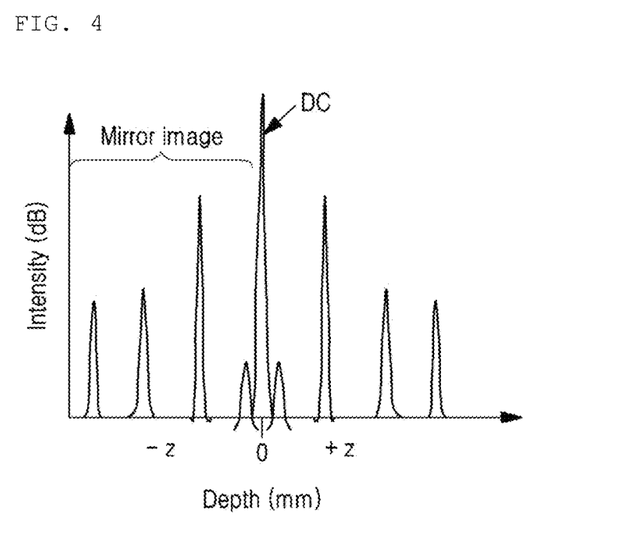
FIG. 4 is a graph showing that the interference signal of FIG. 2 is transformed with respect to a depth axis by the process of FIG. 3.

In the graph of FIG. 4, the DC component of FIG. 2 is displayed around $z=0$ after being Fourier transformed. If the DC component is not removed before Fourier transformation, an intensity of this unnecessary part may be increased to lower a quality of the final cross-sectional image, which requires preliminary removal. In general, the processes shown in FIG. 3 may be performed by a computer. Here, the mirror image may be discarded each time after the calculation is repeatedly performed at a high speed, thus causing a waste of computer calculations in the spectral domain type OCT. This waste also occurs in a swept source type OCT, which requires the same process.

Figure 5A:
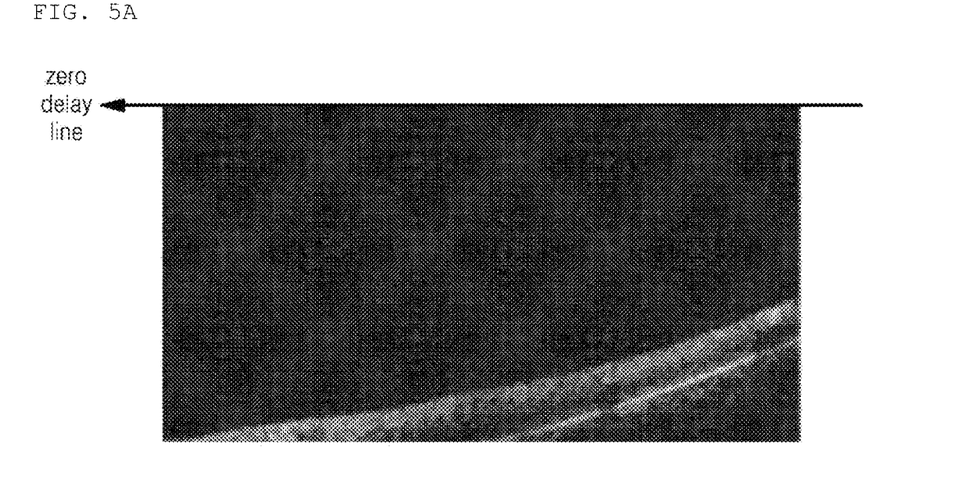
FIG. 5A is a schematic diagram of a retina image captured by the conventional OCT device.
Figure 5B:
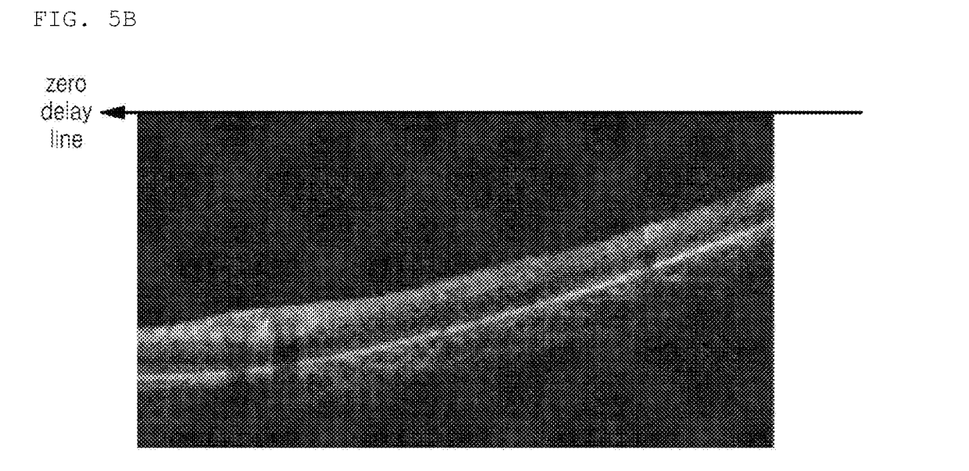
FIG. 5B is a schematic diagram of a retina image captured by the conventional OCT device, and shows a photo captured when the retina image is detected by bringing the conventional OCT device closer to a subject's eye than in FIG. 5A.
Figure 5C:
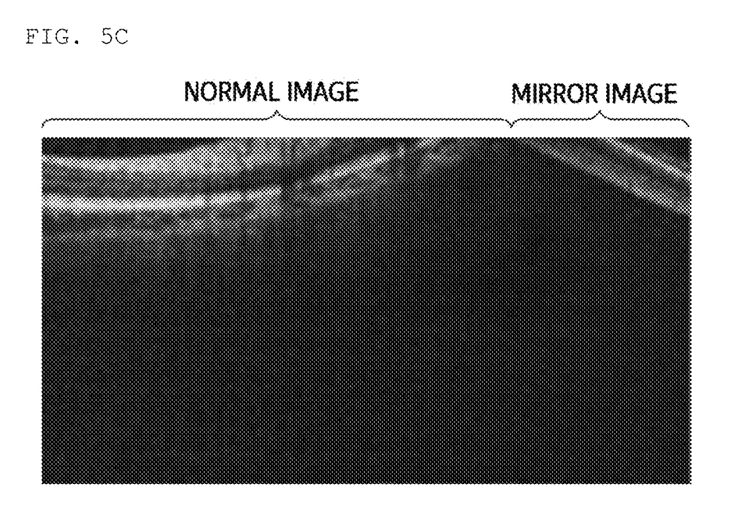
FIG. 5C is a schematic diagram of a retina image captured by the conventional OCT device, and shows a photo captured when the retina image is detected by bringing the conventional OCT device closer to the eye than in FIG. 5B.

A region of depth $z>0$ may indicate a case where a sample light path is larger than a reference light path. Here, if $z<0$ because the sample light path becomes smaller than the reference light path, the region of $z<0$ may thus be removed, and thus be unable to be continuously displayed. Therefore, the region of $z<0$ may be displayed as the mirror image in the region of $z>0$. Therefore, among the sample light signals, a signal returned from a point closer than the reference light may be displayed as an inverted image. The description describes this configuration in detail with reference to FIGS. 5A to 5C. FIGS. 5A to 5C are schematic diagrams of a tomography image of a retina that is captured by the OCT device. The drawings from FIGS. 5A to 5C show images respectively captured by bringing the OCT device closer to a subject's eye. In each drawing, a zero delay line indicates the point where there is no path difference between the reference light and the sample light, and corresponds to a point of $z=0$ in FIG. 4. Referring to FIG. 5A, a line corresponding to a retina surface may be positioned in a region at a lower end of the image. However, referring to FIG. 5B, it may be seen that the line corresponding to the retina surface is moved slightly upward to an upper end of the image. That is, it may be seen that the tomography image and the zero delay line get closer to each other as the subject's eye gets closer to the OCT device, as respectively shown in the drawings from FIGS. 5A to 5B. As shown in FIG. 5C, a portion of the line corresponding to the retina surface may exceed the zero delay line when the OCT device and the eye get closer to each other than in FIG. 5B, and this portion that exceeds the zero delay line may be displayed inverted like the mirror image.

That is, the conventional OCT device may acquire the symmetrical tomography images, and thus use only ½ of a total derived image, and have the region of $z<0$ which is displayed inverted and overlaid on an existing image.

SUMMARY

Technical Problem

An object of the present invention is to provide an optical nonlinearity tomography device having a higher image contrast ratio and a faster image detection speed, and producing a result having a greater observation depth of a biological tissue than a conventional optical coherence tomography (OCT) device.

In this case, the device of the present invention may enable accurate diagnosis deep inside a retina when used in ophthalmology.

Technical Solution

In one general aspect, an optical tomography device includes: a sample optical path system for injecting light scanned from a light source into a sample corresponding to a biological tissue; a reference optical path system for collecting the light scanned from the light source; and a detection unit for detecting a tomography image of the sample by combining sample light transmitted from the sample optical path system and reflected from the sample with reference light transmitted from the reference optical path system to each other. The detection unit may receive the sample light and the reference light, and detect a depth direction signal from a nonlinear beam by using an image sensor, the nonlinear beam being generated by the sample light and the reference light which are mixed with each other while passing through a nonlinear crystal in a spectral domain, instead of being interfered with each other as in a spectral domain optical coherence tomography (OCT) device. Here, the detection unit may distribute the lights for the nonlinear beam to be generated while phase components of the wavelength components, changed based on time and space, cancel each other out when the wavelength components of the sample light and the reference light in the spectral domain meet each other on the nonlinear crystal. In this way, the detection unit may make a component, which causes the light to be swept in the space when the Fourier transformation is spatially performed on the generated nonlinear beam while the beam passes through the lens, no longer exist, thereby detecting a depth direction signal by using the image sensor. The detection unit may require a spectrally dispersed beam generator to enable the detection unit to be operated in the spectral domain, and may typically include a combination of a diffraction grating and a lens, as in a spectral domain-optical coherence tomography (SD-OCT). Therefore, the detection unit may include a spectrally dispersed beam generator for transforming the light into a spread spectrum for each wavelength region and then collecting the lights for the nonlinear beam to be generated while the phase components of the sample light and the reference light cancel each other out; a nonlinear beam generator including a nonlinear crystal for generating the nonlinear beam by mixing the sample light and the reference light, incident through the spectrally dispersed beam generator; a Fourier transformer including a lens and Fourier transforming the light output from the nonlinear beam generator; and an image acquirer including the image sensor disposed at a focal length of the lens, transforming the Fourier transformed nonlinear beam into an electrical signal, and displaying the same as a depth direction signal.

In the nonlinear crystal, a nonlinear phenomenon such as three wave mixing or four wave mixing may be generated. In the three wave mixing, two input lights may be mixed to generate a wave of a new wavelength, and in the four wave mixing, three of the input lights may be mixed to generate a wave of a new fourth wavelength.

When the three wave mixing is generated in the nonlinear crystal of the detection unit, assume that if the wavelengths of the two input lights are $\lambda_1$ and $\lambda_2$, the generated nonlinear beam may have a wavelength of $1/\lambda_3=1/\lambda_1+1/\lambda_2$, which may be referred to as sum frequency mixing. Here, as described above, in order to cancel out the phase component that causes the spatial sweep of the two input lights, the diffraction grating in the spectrally dispersed beam generator may include a first diffraction grating for diffracting the sample light and a second diffraction grating for diffracting the reference light. The first and second diffraction gratings may be disposed symmetrically to each other, and designed for the spectrum of the sample light and the spectrum of the reference light to be dispersed to be opposite to each other and incident on a nonlinear crystal by passing through a lens of the same focal length. That is, when $\lambda_c$ indicates the center wavelength of the light source of this optical tomography device, $\lambda_{min}$ indicates the lowest wavelength, and $\lambda_{max}$ indicates the highest wavelength, the center wavelength $\lambda_c$ of the two incident lights may be incident on the same position of the nonlinear crystal, the reference light may have wavelength of $\lambda_2=\lambda_{max}$ at a position where the sample light has a wavelength of $\lambda_1=\lambda_{min}$, and to the contrary, the reference light may have wavelength of $\lambda_2=\lambda_{min}$ at a position where the sample light has a wavelength of $\lambda_1=\lambda_{max}$. Here, as described above, based on Equation of $1/\lambda_3=1/\lambda_1+1/\lambda_2$ which requires to be satisfied in the sum frequency mixing, the wavelength of the generated nonlinear beam may become $\lambda_3 \approx \lambda_c/2$ at its all positions and become a quasi-monochromatic component. For example, if the wavelength of the light source of the optical tomography device is 1060 nm, the generated wavelength is 530 nm.

In addition, the first and second diffraction gratings may be disposed symmetrically to each other, and disposed for the spectrum of the sample light and the spectrum of the reference light are dispersed symmetrically to each other and incident on the nonlinear optical system, while the diffracted light is output toward the nonlinear crystal.

The sample light and the reference light may respectively be diffracted by the first and second diffraction gratings and then pass through the same lens to reach the nonlinear crystal, or pass through different lenses of the same focal length to reach the nonlinear crystal. These lenses may be collectively referred to as a first lens. Here, the diffraction gratings may be disposed at a front focal length of the first lens, and the nonlinear crystal may be disposed at a rear focal length of the first lens.

In the spectrally dispersed beam generator, the first and second diffraction gratings may be disposed to cross each other in a vertical direction. In this case, the light diffracted from the upper diffraction grating may pass through the top of the first lens, and the light diffracted from the lower diffraction grating may pass through the bottom of the first lens. In this way, the upper and lower diffracted lights may meet each other at the center of the nonlinear crystal disposed at the focal length of the first lens.

The first and second diffraction gratings may be disposed to be parallel to each other in a horizontal direction. In this case, the light diffracted from the left diffraction grating may pass through a left side of the first lens, and the light diffracted from the right diffraction grating may pass through a right side of the first lens. In this way, the left and right diffracted lights may meet each other at the center of the nonlinear crystal disposed at the focal length of the first lens. Here, the first lens may be a cylindrical lens that focuses light only in the left and right directions.

In another embodiment, the first and second diffraction gratings may be implemented as one diffraction grating and disposed for the diffracted light of the two lights incident from the opposite directions to proceed toward the nonlinear crystal. In this case, a diffraction efficiency of one light may generally be lower than that of the other. In addition, unlike when using the plurality of diffraction gratings, the two diffracted beams may proceed collinearly.

Meanwhile, when the four wave mixing is generated in the nonlinear crystal of the detection unit, if the wavelengths of the two input lights are $\lambda_1$ and $\lambda_2$, the generated nonlinear beam may have a wavelength of $1/\lambda_4=2/\lambda_1-1/\lambda_2$. Here, the wavelength of the generated nonlinear beam may be the same as a wavelength of the incident light, and the output light may also have a wavelength of 1060 nm when using the input light of 1060 nm. As described above, when it is necessary to cancel out the phase component that causes the spatial sweep of the two input lights, the diffraction grating in the spectrally dispersed beam generator may allow groove density of the first diffraction grating to be double that of the second diffraction grating and use a lens of the same focal length, or use the same diffraction grating while making the focal length of one lens twice as large as that of the other lens.

In the detection unit, the nonlinear crystal may be selected from several crystal materials based on the wavelength of the input light, and may maximize the generated nonlinear beam by adjusting its angle, polarization, or temperature to achieve phase matching.

In addition, in the detection unit, a second lens may be disposed behind the nonlinear crystal to focus the generated nonlinear beam, and the nonlinear crystal may be generally disposed at a front focal length of the second lens. In this case, a Fourier transformed image of the spatial distribution of the nonlinear beam generated from the nonlinear crystal, that is, the depth direction signal, may be spatially formed at a rear focal length of the second lens. The detection unit may acquire a depth direction image as the electrical signal by disposing the image sensor in this position. Alternatively, the detection unit may change the depth direction signal into the electrical signal by disposing a relay optical system, assigning a zoom function of enlarging or reducing the depth direction signal, and then disposing the image sensor.

In addition, the detection unit may further include a filter for filtering the nonlinear beam generated from the nonlinear crystal and transmit the same to the image sensor.

The filter may remove the sample light and the reference light that passed through the nonlinear crystal and allow only the nonlinear beam to pass therethrough when the nonlinear crystal generates the nonlinear beam while allowing the sample light and the reference light to pass therethrough. In particular, as described above, the filter may be essential for a case where the detection unit uses one diffraction grating, the diffracted sample light and reference light proceed collinearly, and the two input lights that passed through the nonlinear crystal and the generated nonlinear beam thus also proceed on the same line.

In addition, when the nonlinear crystal allows the sample light and the reference light to pass therethrough and generates the nonlinear beam, the second lens may be designed to have a size enabling the sample light and the reference light to escape a detection region of the image sensor and only the nonlinear beam to be focused on the image sensor.

In addition, the image sensor may be designed to recognize even a wavelength higher than a wavelength of the nonlinear beam and lower than that of the sample light or the reference light when the wavelength of the sample light or the reference light is greater than the wavelength of the nonlinear beam (e.g., in case of the three-wave mixing), and may thus recognize the nonlinear beam without recognizing the sample light or the reference light.

In addition, in general, a Fourier transform value of the nonlinear beam collected by the image acquirer may not include a mirror image based on a depth value where there is no path difference between the reference light and the sample light.

In another general aspect, an optical tomography method may include: injecting, by an optical tomography device, light scanned from an internal light source into a sample corresponding to a biological tissue; and detecting a tomography image of the sample by combining sample light reflected from the sample and reference light scanned from the light source, wherein the detecting of the tomography image includes generating a nonlinear beam having a wavelength different from that of the sample light or the reference light by receiving the sample light and reference light, incident on a nonlinear crystal through a spectrally dispersed beam generator, and detecting, by a lens and an image sensor performing spatial Fourier transformation, a depth direction signal from the nonlinear beam.

Advantageous Effects

As set forth above, the present invention may provide the optical nonlinearity tomography device having the higher image contrast ratio and the faster image detection speed, and producing the result having the greater observation depth of the biological tissue than the conventional optical coherence tomography (OCT) device.

In addition, the detection unit of the spectral domain-optical nonlinearity tomography (SD-ONT) according to the present invention may be provided at a much lower cost than the conventional OCT device. In detail, when the light source of the ONT has a long wavelength, light may penetrate deeper into the biological tissue. However, when the wavelength is longer than 1 μm, it is difficult for the conventional Si image sensor to detect this wavelength, thus requiring the InGaAs image sensor. However, the InGaAs image sensor is more expensive than the Si image sensor, which increases the price of the OCT device. Even when using the light source of 1 μm or longer, the SD-ONT of the present invention may use the conventional Si image sensor because the nonlinear beam generated by the detection unit is in the visible light range. Therefore, the present invention may provide the lower-cost device having the same or higher performance than the OCT device using the conventional InGaAs image sensor.

In addition, the conventional OCT device may acquire the electrical signal and then use the computer to perform the signal processing for the interference signal detected by the image sensor, such as the direct current (DC) component removal or Fourier transformation. On the other hand, the SD-ONT of the present invention may have the much higher processing speed because this process is performed instantaneously in the optical setup and requires no separate processing using the computer.

In addition, the conventional OCT device adopts the method of detecting the interference signal and then performing Fourier transform. Therefore, the maximum frequency of the signal that may be sampled may be increased as the pixel size and pixel spacing of the image sensor are smaller, and the conventional OCT device may thus detect the biological tissue at the deeper observation depth. However, it is impossible to make the pixel size and pixel spacing of the image sensor infinitely small, and there is thus a limit to the depth of the biological tissue which may be observed by the conventional OCT device. The SD-ONT of the present invention may perform Fourier transformation by using the lens and then perform the detection to thus eliminate the limitation on the pixel size or the pixel spacing during the signal sampling, thereby observing the biological tissue at the deeper position than the conventional OCT device.

DETAILED DESCRIPTION

Hereinafter, embodiments of the present invention will be described in detail with reference to the accompanying drawings for those skilled in the art to which the present invention pertains to easily practice the present invention. However, the present invention may be modified in various different forms, and is not limited to the embodiments provided herein. In addition, in the drawings, portions unrelated to the description are omitted to clearly describe the present invention, and similar portions are denoted by similar reference numerals throughout the specification.

Throughout the specification, when one part is referred to as being "connected to" another part, one part and another part may be "directly connected to" each other, or may be "electrically connected to" each other while having a third part interposed therebetween. In addition, when a part "includes" any component, it may indicate the inclusion of other components rather than the exclusion of other components unless explicitly described to the contrary.

In the specification, a " . . . unit" may include a unit realized by hardware, a unit realized by software, and a unit realized using both the hardware and software. In addition, one unit may be realized using two or more hardware, and two or more units may be realized using one hardware. Meanwhile, the meaning of the " . . . unit" is not limited to software or hardware, and each of the units may reside in an addressable storage medium and reproduce one or more processors. Therefore, as an example, the " . . . unit" may include components such as software components, object-oriented software components, class components, or task components, and include processes, functions, attributes, procedures, sub-routines, segments of program code, drivers, firmware, microcode, circuits, data, databases, data structures, tables, arrays, and variables. The components or the " . . . units" may provide their functions by being coupled into a smaller number of components or " . . . units", or further divided into additional components or " . . . units". In addition, the components or the " . . . units" may be implemented to reproduce one or more central processing units (CPUs) in a device or a secure multimedia card.

A "device" mentioned below may be implemented as a computer or a portable terminal, which may be connected to a server or another terminal through a network. In addition, a "network" indicates a connection structure enabling information exchange between nodes such as terminals and servers, and includes a local area network (LAN), a wide area network (WAN), Internet (or world wide web (WWW)), a wired or wireless data communication network, a telephone network, a wired or wireless television network, or the like. An example of the wireless data communication network may include third generation (3G), fourth generation (4G), fifth generation (5G), third generation partnership project (3GPP), long term evolution (LTE), world interoperability for microwave access (WIMAX), wireless-fidelity (Wi-Fi), Bluetooth communication, infrared communication, ultrasonic communication, visible light communication (VLC), visible light communication, Light Fidelity (LiFi), or the like, and is not limited thereto.

Figure 6:
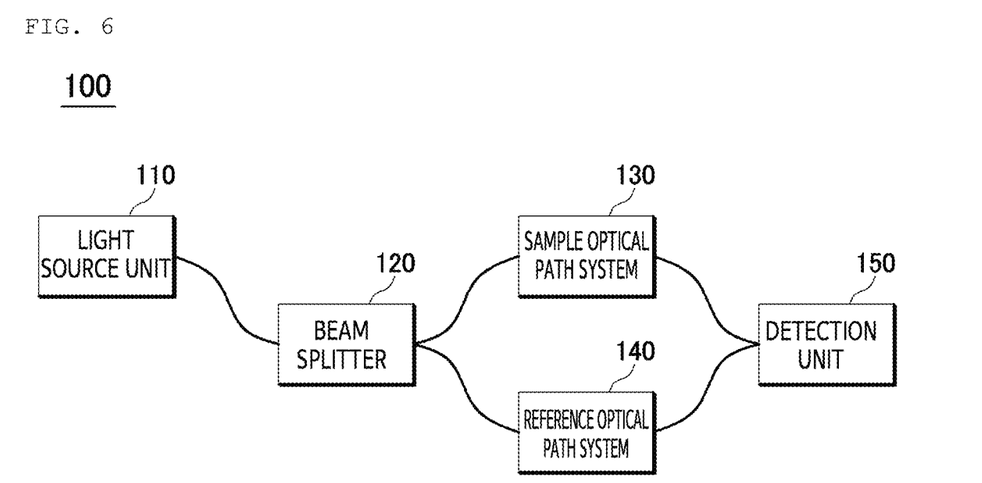
FIG. 6 is a structural diagram of a spectral domain-optical nonlinearity tomography (SD-ONT) device according to an embodiment of the present invention.

Hereinafter, the description describes an optical tomography device according to an embodiment of the present invention in detail with reference to FIG. 6.

The optical tomography device according to an embodiment of the present invention may also be referred to as a spectral domain-optical nonlinearity tomography (SD-ONT) device.

The optical tomography device according to an embodiment of the present invention may include a light source unit 110, a beam splitter 120, a sample optical path system 130, a reference optical path system 140, and a detection unit 150.

The light source unit 110 is a component that emits light having a short coherence length and a predetermined wavelength band. For example, the light source unit 110 may use a super-luminescent diode (SLD). However, the light source unit 110 is not necessarily limited thereto, and may use various light sources.

The beam splitter 120 is a component that splits light generated from the light source into two branches. The beam splitter 120 may have a structure that includes a beam splitter or a directional coupler to split light. The lights split by the beam splitter 120 may respectively be incident on the sample optical path system 130 and the reference optical path system 140.

The sample optical path system 130 is a component that causes light to be incident on a sample such as a biological tissue. The sample optical path system 130 may allow light to be incident on the sample and then transmit light reflected through the sample to the detection unit 150. Here, sample light indicates light passed through the sample optical path system 130. A depth direction signal may be acquired at one point within the sample when there is no change in a path of light incident in the sample optical path system 130. Therefore, in most cases, the sample optical path system 130 may have a beam scanner or the like disposed in a sample light path to thus allow the sample light to be incident on one axis (e.g., longitudinal axis) and detect the returned sample light, thereby acquiring a two-dimensional cross-sectional image of the sample. Alternatively, the sample optical path system 130 may allow the sample light to be incident in two axes (e.g., longitudinal axis and transverse axis) and detect the returned sample light, thereby acquiring a three-dimensional cross-sectional image of the sample.

The reference optical path system 140 is a component including a reflection mirror, and reflecting light incident from the beam splitter 120 and transmitting the same to the detection unit 150. Reference light indicates light passed through the reference optical path system 140. In general, a length (that is, a value associated with a movement length of the reference light in the reference optical path system 140) of the reference optical path system 140 may depend on a length (that is, a value associated with a movement length of the sample light in the sample optical path system 130) of the sample optical path system 130. The OCT may acquire a cross-sectional image of the sample after setting the length of the reference optical path system 140 to match the uppermost end (or the shortest path of the sample optical path system 130) or lower most end (or the longest path of the sample optical path system 130) of the cross-sectional image of the sample. However, the SD-ONT according to an embodiment of the present invention may adjust the length of the reference optical path system 140 for the cross-sectional image of the sample to be positioned at the center of the cross-sectional image.

The detection unit 150 may function to receive the sample light and the reference light, perform appropriate optical processing thereon, and then allow the processed light to be incident on an image sensor 159c, thereby extracting depth information of the sample.

The detection unit 150 according to an embodiment of the present invention may detect the depth direction signal in such a way that a nonlinear beam is generated by mixing the sample light and the reference light together without causing interference between the sample light and the reference light, and the nonlinear beam is incident on the image sensor 159c.

To this end, a nonlinear crystal 155b may generate the nonlinear beam having a wavelength different from that of the sample light or that of the reference light when three or more waves are mixed together.

Unlike in a conventional OCT device, the SD-ONT of the present invention may acquire this nonlinear beam as an electrical signal from the image sensor 159c after optically removing the DC component from the nonlinear beam. Accordingly, the SD-ONT of the present invention may utilize an entire dynamic range (DR) of the image sensor 159c, thus providing an improved image contrast ratio compared to the conventional OCT device. Therefore, the SD-ONT device of the present invention may capture deep inside the biological tissue which is a detection target, and capture an accurate image, which may be very useful in deriving an accurate diagnosis when used as a medical device.

Figure 7:
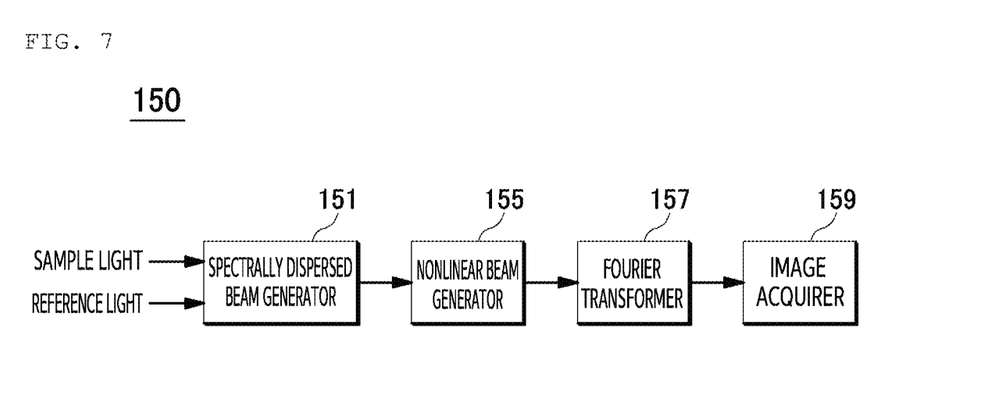
FIG. 7 is a block diagram of a structure of a detection unit according to an embodiment of the present invention.

The description describes the detection unit 150 according to an embodiment of the present invention in more detail with reference to FIG. 7.

The detection unit 150 according to an embodiment of the present invention may include a spectrally dispersed beam generator 151, a nonlinear beam generator, a Fourier transformer 157, and an image acquirer 159.

The spectrally dispersed beam generator 151 may generate a spectrum for the incident sample light or reference light to have a spread spectrum for each wavelength region, and then collect the same onto the nonlinear beam generator 155. The nonlinear beam generator 155 may generate the nonlinear beam by mixing the spectra of the incident sample light and reference light for each wavelength. The nonlinear beam may have a wavelength different from that of the sample light or the reference light. The Fourier transformer 157 may physically Fourier transform the nonlinear beam to thus allow the depth direction signal to be distributed in a space in an incident region of the image acquirer 159 (that is, the image sensor 159c). The image acquirer 159 may detect the depth direction signal by receiving the Fourier transformed nonlinear beam from a linear scan camera (that is, the image sensor) and acquiring the same as the electrical signal. Here, the depth direction signal may indicate a signal for monolayer information of the sample based on its depth at a specific point, may be a combination of depth direction signals for several points on the sample based on a horizontal scan of the beam scanner disposed in the sample light path, and may be used to generate a final two-dimensional or three-dimensional tomography image.

Figure 8A:
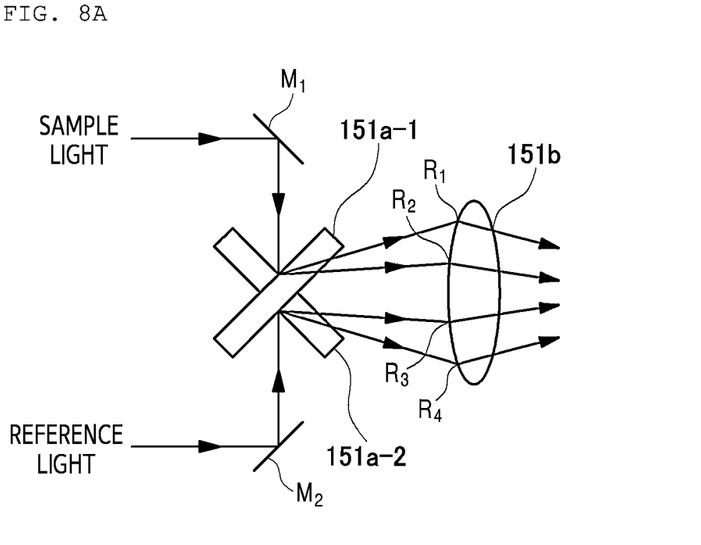
FIG. 8A is a schematic diagram showing a structure of a spectrally dispersed beam generator and a first lens according to an embodiment of the present invention.

Referring to FIG. 8A, the spectrally dispersed beam generator 151 in an embodiment may include one or more diffraction gratings and a first lens 151b. The first lens may include at least one lens according to a further embodiment. The spectrally dispersed beam generator may use the diffraction grating to disperse the spectra of the sample light and the reference light for each wavelength, and then input the light to the first lens 151b including one or more circular or cylindrical lenses. The sample light and the reference light that passed through the first lens 151b may be collected and exactly aligned at the center of the nonlinear crystal 155b to cause the mixing of three or more waves or the mixing of four or more waves.

Figure 8B:
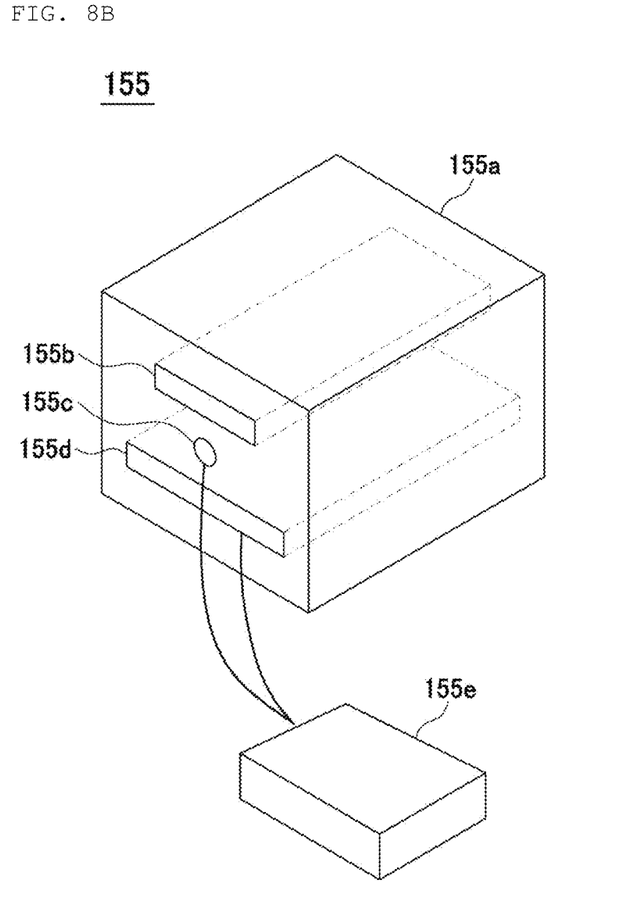
FIG. 8B is a schematic diagram of a structure of a nonlinear beam generator according to an embodiment of the present invention.

Referring to FIG. 8B, the nonlinear beam generator 155 may include the nonlinear crystal 155b generating the nonlinear beam by mixing the spectra of the reference light and the sample lights collected onto the first lens 151b. The nonlinear crystal 155b may optimize phase matching of the nonlinear beam by controlling its temperature. In detail, the nonlinear crystal 155b may be installed in an oven 155a equipped with a heater 155d and a temperature sensor 155c. A temperature controller 155e may continuously collect feedback on the temperature of the nonlinear crystal 155b and maintain the nonlinear crystal 155b at a predetermined temperature. In a separate embodiment, the nonlinear crystal may be disposed on a stand to precisely adjust its angle when optimizing the phase matching of the nonlinear crystal 155b by using its angle.

Figure 8C:
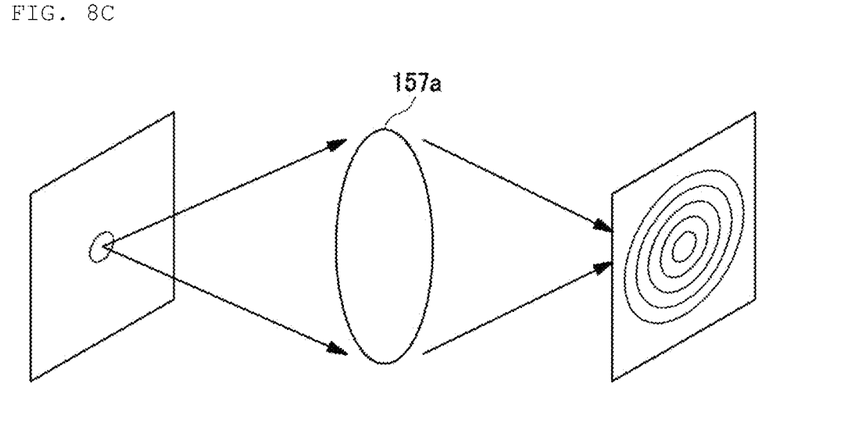
FIG. 8C is a schematic diagram of a structure of a Fourier transformer according to an embodiment of the present invention.

Referring to FIG. 8C, the Fourier transformer 157 may include a second lens 157a for physically (or spatially) performing Fourier transformation on the nonlinear beam that is generated from the nonlinear crystal 155b and spatially spreads out and transforming the same into the spatial depth direction signal. That is, when allowing the beam output from the nonlinear crystal 155b to pass through the second lens 157a, the Fourier transformer 157 may physically Fourier transform the beam rather than Fourier transforming the beam by using a software algorithm to thus make the beam incident on the image acquirer 159.

Figure 8D:
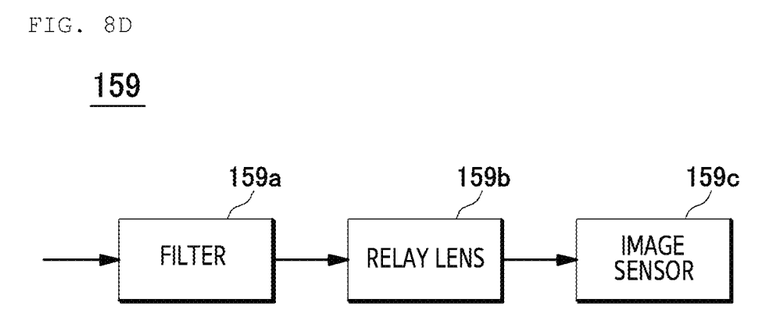
FIG. 8D is a block diagram of a structure of an image acquirer according to an embodiment of the present invention.

Referring to FIG. 8D, the image acquirer may include the image sensor 159c disposed at a focal position of the second lens 157a and transforming the spatially-spread depth direction signal into the electrical signal. The image acquirer may further include a filter 159a for filtering the sample light and the reference light excluding the nonlinear beam. In addition, the image acquirer may include at least one relay lens 159b for zooming in or out of a depth profile formed on the image sensor 159c.

Meanwhile, the description describes the structure of the spectrally dispersed beam generator 151 in more detail with reference to FIG. 8A. In detail, the spectrally dispersed beam generator 151 may include one or more diffraction grating and one or more lenses. As shown in FIG. 8A, the spectrally dispersed beam generator 151 may include, for example, a first diffraction grating 151a-1 for diffracting the sample light and a second diffraction grating 151a-2 for diffracting the reference light. Here, the first diffraction grating 151a-1 and the second diffraction grating 151a-2 may be disposed symmetrically to each other. In addition, the first diffraction grating 151a-1 and the second diffraction grating 151a-2 may be disposed to cross each other in a vertical direction or disposed to be parallel to each other in a horizontal direction. As shown in FIG. 8A, the sample light and the reference light may each be reflected through the mirror to be incident on the diffraction grating. The detection unit 150 may further include a first reflected mirror M1 reflecting the sample light toward the first diffraction grating 151a-1 and a second reflected mirror M2 directing the reference light to the second diffraction grating 151a-2.

Here, the sample light may be diffracted by the first diffraction grating 151a-1 and directed to the first lens 151b, and the reference light may be diffracted by the second diffraction grating 151a-2 and directed to the first lens 151b. The first diffraction grating 151a-1 and the second diffraction grating 151a-2 may be designed for the spectrum of the sample light and the spectrum of the reference light, incident on the first lens 151b, to be opposite to each other. Metaphorically, two edge regions of the light spectrum may respectively be defined as a red region (of a high wavelength) and a violet region (of a low wavelength). In this case, the first diffraction grating 151a-1 may diffract the sample light for R1 to be the red region and R2 to be the violet region. In addition, the second diffraction grating 151a-2 may diffract the reference light for R3 to be the violet region and R4 to be the red region. The two spectra that passed through the first lens 151b may be collected in the nonlinear crystal 155b, thus causing R1 to meet R3 and mix with each other and R2 to meet R4 and mix with each other.

The diffraction grating may include a pattern structure having a predetermined direction to diffract light. When changing the direction of the pattern structure to its opposite direction, the diffraction grating may set a spectral direction of the incident light to the opposite direction. Based on this principle, the diffraction grating may allow the first and second diffraction gratings 151a-1 and 151a-2 to generate spectra of opposite phases.

The reason for setting the spectral directions of the sample light and the reference light to the opposite directions is as follows. Light having a specific phase may be expressed as a complex component. When two lights having the complex components are mixed together, this process may be expressed as the two complex components operating on each other. Light passing through the spectrally dispersed beam generator 151 may have a phase component that allows the light to be swept in space over time. In order for the phase components to cancel each other out as the two lights are mixed together, the spectral directions of the sample light and the reference light may be set to the opposite directions.

The sample light and the reference light that passed through the first lens 151b may be incident on the nonlinear crystal 155b. The nonlinear crystal 155b may generate light of a new wavelength when receiving specific first and second lights. For example, the first light having a wavelength of $\lambda_1$ and the second light having a wavelength of $\lambda_2$ may be incident and mixed together. In this case, the nonlinear crystal 155b may emit a third light having a wavelength of $\lambda_3$ satisfying $1/\lambda_3 = 1/\lambda_1 + 1/\lambda_2$. This phenomenon may be referred to as sum frequency mixing. If $\lambda_1 = \lambda_2$ to emit the third light having a wavelength of $\lambda_3 = \lambda_1/2$, this phenomenon may be referred to second harmonic generation. Here, $\lambda_3$ is different from $\lambda_1$ or $\lambda_2$, and the nonlinear crystal may thus emit the light having a different wavelength from a wavelength of the incident light.

The nonlinear crystal 155b may include a material such as lithium triborate (LBO), beta-barium borate (BBO), potassium titanyl phosphate (KBO), or periodically poled lithium niobate (PPLN), and is not necessarily limited thereto.

In general, the detection unit 150 may have a 4f structure. In detail, the diffraction grating may be disposed at a front focal length of the first lens 151b and the nonlinear crystal 155b may be disposed at its rear focal length. In addition, similarly, the nonlinear crystal 155b may be disposed at a front focal length of the second lens and the image sensor 159c may be disposed at its rear focal length.

The Fourier transformer 157 may instantaneously perform Fourier transformation physically rather than performing the same by using the computer, thus not requiring any separate Fourier transform processing performed using the computer, as in the conventional OCT device, after receiving the interference signal from the image sensor 159c, thereby securing a faster internal processing speed of the SD-ONT device.

Meanwhile, the filter 159a may function to remove the sample light or the reference light to thus prevent the light from being incident on the image sensor 159c. The nonlinear crystal may not emit only the nonlinear beam. The incident sample light and reference light may be transmitted through the nonlinear crystal, and emitted from the nonlinear crystal. That is, the nonlinear crystal may emit three types of lights including the sample light, the reference light, and the nonlinear beam. Here, the sample light and the reference light may be incident on the image sensor 159c to thus cause the DC component that is problematic in the conventional OCT device. Accordingly, the filter 159a may remove the sample light and the reference light and allow the nonlinear beam to pass therethrough. This filter 159a may be essential in a collinear structure in which the sample light and the reference light proceed on the same line.

Meanwhile, the SD-ONT of the present invention may allow only the nonlinear beam to be passed through by using another method instead of using the filter 159a. For example, the second lens 157a may be designed to have a size enabling the second lens 157a to remove the sample light and the reference light and allow the nonlinear beam to pass therethrough. In this case, the second lens 157a may naturally function to filter the sample light and the reference light.

Alternatively, the SD-ONT of the present invention may detect only the nonlinear beam. In general, whether the sensor is an indium gallium arsenide (InGaAs) sensor or a silicon (Si) sensor, every image sensor 159c may have a separate wavelength region that the sensor may detect. For example, it may be difficult for the Si sensor to detect light having a wavelength longer than 1 μm. Therefore, the image sensor 159c may not recognize the sample light or the reference light, and only recognize the nonlinear beam even without the separate filter 159a when including a medium capable of recognizing a wavelength higher than the wavelength of the nonlinear beam and lower than the wavelength of the sample light or the reference light, or coated with the film-type filter 159a of this property.

Figure 9:
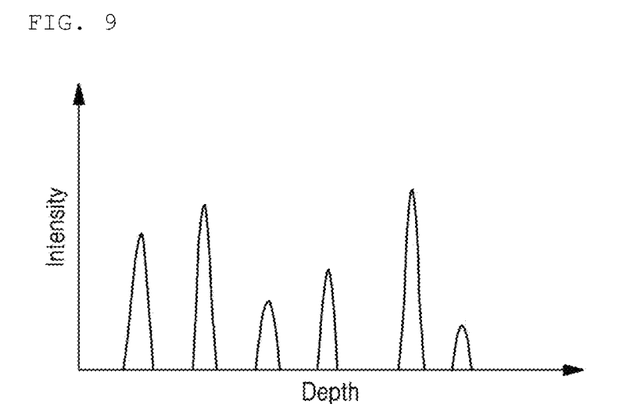
FIG. 9 is a graph showing Fourier transformation of a nonlinear beam signal of the SD-ONT device according to an embodiment of the present invention.

A result of the transformation performed based on a principle of Fourier transformation derives a symmetrical signal with respect to its center when an asymmetrical signal is input, and derives the asymmetrical signal with respect to its center when the symmetrical signal is input. In the conventional OCT, which receives the asymmetric signal as shown in FIG. 2 and performs Fourier transform thereon, its output result may be the symmetrical signal with respect to z=0, as shown in FIG. 4. Therefore, the conventional OCT may acquire only a portion of the signal where z>0 as the tomography image by mainly removing its left side. On the other hand, a wavelength-intensity graph of the nonlinear beam according to an embodiment of the present invention may initially be generated in a symmetrical form from the nonlinear crystal 155b, and may thus be produced to be asymmetrical based on a depth value, as shown in FIG. 9 when the nonlinear beam is Fourier transformed by the second lens 157a. It may be seen that this graph, which is clearly different from that shown in FIG. 2 is produced. That is, the conventional device may be required to discard half of the depth direction signal processed by the computer. On the other hand, the present invention may generate the tomography image by using all the depth direction signals detected by the image sensor 159c. Accordingly, according to an embodiment of the present invention, it is also possible to eliminate a waste factor of separately discarding half of the regions detected by the image sensor 159c.

In addition, the detection unit 150 according to an embodiment of the present invention may not allow the reference light to be incident on the image sensor 159c and thus detect no DC component. Referring to the graph in FIG. 9, it may be seen that no DC component is detected. Accordingly, the SD-ONT device of the present invention may utilize the entire dynamic range of the image sensor 159c without requiring the DC removal process, thus securing the improved image contrast ratio and the faster processing speed.

Meanwhile, like a microscope including a plurality of objective lenses, the detection unit 150 may also include the plurality of second lens 157a and replace the lenses to change the focal length of the lens, thereby zooming-in or out the tomography image. Alternatively, the SD-ONT of the present invention may implement the zoom function by fixing the second lens 157a, attaching a separate relay lens group to its rear end, and replacing the lenses. The conventional OCT device may implement the zoom-in function by binning the already acquired depth direction signal and sacrificing the observed depth value. On the other hand, the SD-ONT of the present invention may change only a depth direction scale while maintaining an energy value of the light acquired by the image sensor 159c, thus providing a clearer zoom-in/zoom-out image in a very simple way when implementing its zoom-in/zoom-out function.

Hereinafter, the description describes in detail an optical tomography method according to an embodiment of the present invention.

The optical tomography method may include: injecting, by an optical tomography device, light scanned from an internal light source into a sample corresponding to a biological tissue; and detecting, by the optical tomography device, a tomography image of the sample by combining sample light reflected from the sample and reference light scanned from the light source. Here, the detecting of the tomography image may include generating a nonlinear beam having a wavelength different from that of the sample light or the reference light by receiving the sample light and reference light, incident on a nonlinear crystal 155b, and detecting, by an image sensor 159c, a depth direction signal from the nonlinear beam.

An embodiment of the present invention may also be implemented in the form of a recording medium including an instruction which may be executed by the computer, such as a program module executed by the computer. A computer-readable medium may be any available medium that may be accessed by the computer, and include both volatile and non-volatile media, and removable and non-removable media. In addition, the computer-readable medium may include any computer storage medium. The computer storage medium may include both the volatile and non-volatile media and both the removable and non-removable media, implemented using any method or technology for storing information such as a computer-readable instruction, a data structure, a program module or another data.

The method and system of the present invention are described with respect to the specific embodiment. However, some or all of the components or operations of the method or system may be implemented using a computer system having a general-purpose hardware architecture.

The embodiments described above are illustratively provided, and it is apparent to those skilled in the art to which the present invention pertains that the present invention may be embodied in another specific form without any change in the technical idea or essential feature of the present invention. Therefore, it is to be understood that the embodiments described hereinabove are illustrative rather than restrictive in all respects. For example, the components each described as a single type may also be implemented in a distributed manner, and similarly, the components described as being distributed from each other may also be implemented in a coupled manner.

It is to be understood that the scope of the present invention is defined by the claims disclosed below rather than the detailed description provided above, and includes all alternations and modifications derived from the claims and their equivalents.

What is claimed is:

1. An optical tomography device comprising:
a sample optical path system for injecting light scanned from a light source into a sample corresponding to a biological tissue;
a reference optical path system for collecting the light scanned from the light source; and
a detection unit for detecting a tomography image of the sample by combining sample light transmitted from the sample optical path system and reflected from the sample with reference light transmitted from the reference optical path system to each other,
wherein the detection unit comprises:
a spectrally dispersed beam generator transforming each of the sample light and the reference light to have a spread spectrum for each wavelength component and then collecting the lights,
a nonlinear beam generator including a nonlinear crystal for generating a nonlinear beam having a wavelength different from that of the sample light or the reference light by mixing the sample light and the reference light, incident thereon through the spectrally dispersed beam generator, and
an image acquirer detecting a depth direction signal from the nonlinear beam.

2. The device of claim 1, wherein the spectrally dispersed beam generator includes a first diffraction for grating diffracting the sample light and a second diffraction for grating diffracting the reference light, and
the first diffraction grating and the second diffraction grating are disposed symmetrically to each other, and designed for the spectrum of the sample light and the spectrum of the reference light to be dispersed symmetrically to each other and incident on a nonlinear optical system.

3. The device of claim 2, wherein the first and the second diffraction gratings are disposed to cross each other in a vertical direction or disposed to be parallel to each other in a horizontal direction.

4. The device of claim 2, wherein the spectrally dispersed beam generator further includes a first lens for collecting the sample light and the reference light that respectively passed through the first and second diffraction gratings, and
the first lens includes at least one lens.

5. The device of claim 1, wherein the spectrally dispersed beam generator includes one diffraction grating disposed for diffracted lights of the sample light and the reference light, incident from opposite directions, to proceed toward the nonlinear crystal.

6. The device of claim 1, wherein the nonlinear beam generator generates the nonlinear beam by mixing three wavelengths together or mixing four wavelengths together.

7. The device of claim 1, wherein the detection unit includes
a Fourier transformer including a second lens and spatially Fourier transforming light output from the nonlinear beam generator; and
the image acquirer detecting the depth direction signal from the nonlinear beam that passed through the second lens.

8. The device of claim 7, wherein the image acquirer further includes a filter for removing the reference light and the sample light from the nonlinear beam that passed through the second lens of the Fourier transformer.

9. The device of claim 7, wherein the second lens of the Fourier transformer is designed to remove the sample light and the reference light and allow the nonlinear beam to pass therethrough when the nonlinear crystal allows the sample light and the reference light to pass therethrough and generates the nonlinear beam.

10. The device of claim 7, wherein the nonlinear beam generator is disposed at a position corresponding to a rear focal length of a first lens included in the spectrally dispersed beam generator and a front focal length of the second lens included in the Fourier transformer,
a diffraction grating is disposed at a position corresponding to a front focal length of the first lens, and
an image sensor in the image acquirer is disposed at a position corresponding to a rear focal length of the second lens included in the Fourier transformer.

11. The device of claim 10, wherein the Fourier transformer includes a plurality of lenses, or the image acquirer includes relay lenses including the plurality of lenses to change the focal length of the lens, thereby zooming-in or zooming-out the tomography image.

12. An optical tomography method comprising:
injecting, by an optical tomography device, light scanned from an internal light source into a sample corresponding to a biological tissue; and
detecting, by the optical tomography device, a tomography image of the sample by combining sample light reflected from the sample and reference light scanned from the light source,
wherein the detecting of the tomography image includes
generating spectrally dispersed light of transforming each of the sample light and the reference light to have a spread spectrum for each wavelength component and then collecting the lights,
generating a nonlinear beam having a wavelength different from that of the sample light or the reference light by receiving the sample light and the reference light, incident on a nonlinear crystal, and mixing the incident sample light and reference light at the generating of the spectrally dispersed light, and
detecting, by an image sensor, a depth direction signal from the nonlinear beam.

* * * * *